United States Patent
Kamiya et al.

[19]

[11] Patent Number: 6,127,792
[45] Date of Patent: Oct. 3, 2000

[54] CONTROL APPARATUS FOR ROBOT

[75] Inventors: Koji Kamiya, Anjo; Shinji Iida, Nagoya, both of Japan

[73] Assignee: Denso Corporation, Kariya, Japan

[21] Appl. No.: 09/280,452

[22] Filed: Mar. 30, 1999

[30] Foreign Application Priority Data

Mar. 30, 1998 [JP] Japan ............................ 10-084175

[51] Int. Cl.$^7$ ........................................... H02P 7/00
[52] U.S. Cl. .................. 318/432; 318/434; 318/568.22; 318/568.11; 318/568.2; 901/28; 901/23; 901/15
[58] Field of Search ................................ 318/432, 434, 318/568.22, 568.11, 568.2; 901/28, 15, 23

[56] References Cited

U.S. PATENT DOCUMENTS

| | | | |
|---|---|---|---|
| 4,705,999 | 11/1987 | Soji et al. ............................ | 318/568 |
| 4,807,153 | 2/1989 | Onaga et al. ....................... | 318/563 |
| 5,994,864 | 11/1999 | Inoue et al. ....................... | 318/568.2 |

FOREIGN PATENT DOCUMENTS

| | | |
|---|---|---|
| 60-230206 | 11/1985 | Japan . |
| 64-7105 | 1/1989 | Japan . |
| 5-138563 | 6/1993 | Japan . |

*Primary Examiner*—Karen Masih
*Attorney, Agent, or Firm*—Pillsbury Madison & Sutro LLP

[57] ABSTRACT

In cases where every sampling time has elapsed, a position of the joint which will occur at a moment of end of a next sampling time is calculated on the basis of a speed pattern. Calculation is made as to a drive torque designed to move the joint to the calculated position. In cases where the calculated drive torque exceeds a predetermined limit value, a speed change ratio designed to reduce the drive torque is calculated. In addition, calculation is made as to a corrected sampling time on the basis of the calculated speed change ratio. The corrected sampling time is shorter than a normal sampling time. In cases where the calculated drive torque does not exceed the predetermined limit value, the calculated position is set as a command position and the joint is controlled to move to the command position after a predetermined unit control time elapses. In cases where the calculated drive torque exceeds the predetermined limit value, a position of the joint is calculated again while the corrected sampling time is used as the next sampling time. Then, the calculated position is set as a command position and the joint is controlled to move to the command position after the predetermined unit control time elapses.

2 Claims, 4 Drawing Sheets

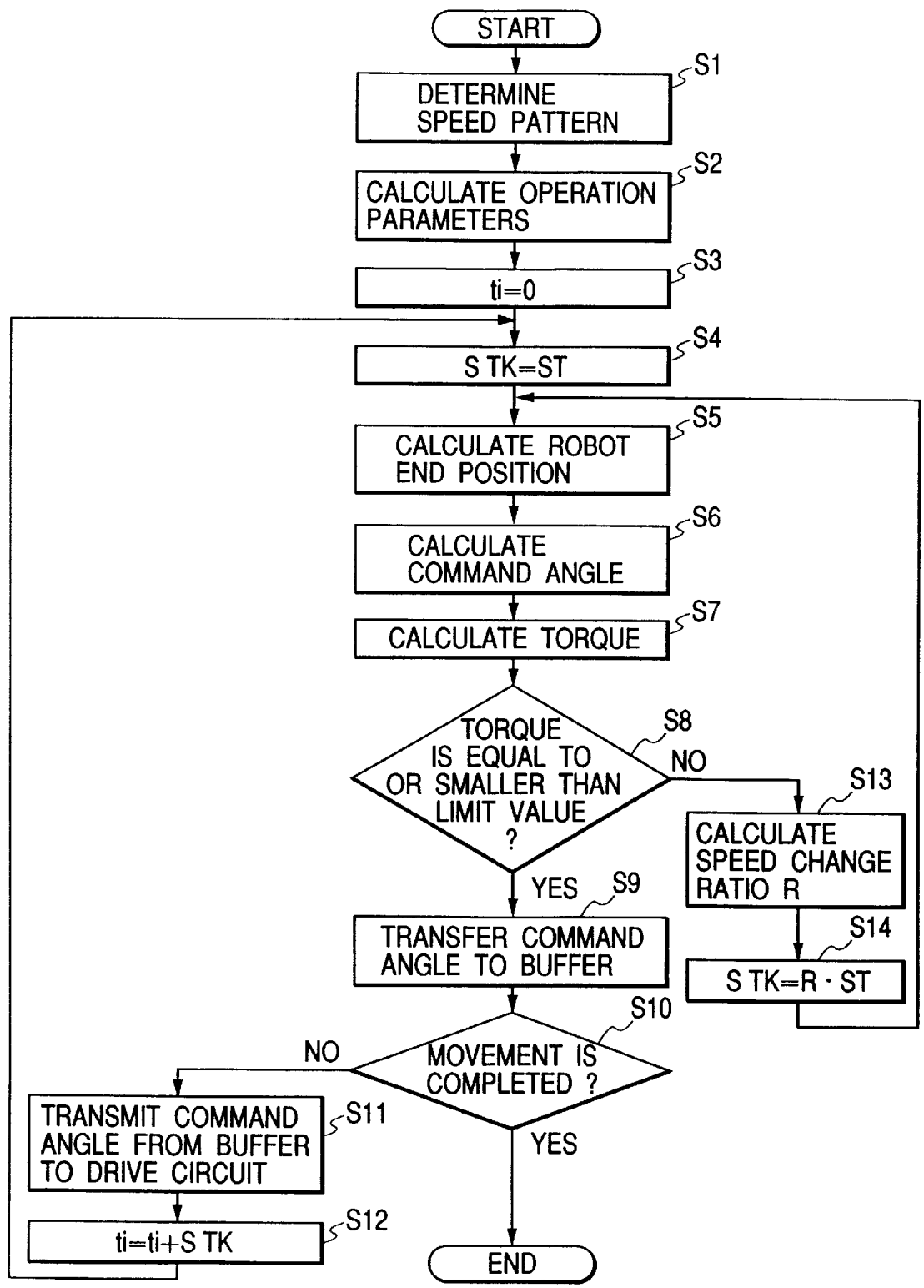

CONTROL APPARATUS FOR ROBOT

BACKGROUND OF THE INVENTION

1. Field of the Invention

This invention generally relates to a control apparatus for a robot. This invention specifically relates to an apparatus designed so that a motor for actuating a joint in a robot is used in controlling movement of the robot.

2. Description of the Related Art

A typical multiple-joint industrial robot has a plurality of movable portions connected by joints. The movable portions or the joints are coupled via power transmission mechanisms with actuators such as direct-current servo motors. The movable portions or the joints can be rotated by drive torques transmitted from the motors. Generally, the typical robot has an operative end. Movement of the operative robot end is given by a resultant of movements of the movable portions. The motors are controlled by a computer-based circuit which operates in accordance with an operation program (a control program). The operation program is designed so that movement of the operative robot end will agree with desired movement or programmed movement.

Prior-art control of rotation of a joint in a robot is as follows. A rotary encoder associated with the output shaft of a joint drive motor outputs a signal representing the present angular position of the joint. The joint drive motor is controlled in response to the output signal of the rotary encoder and an instruction signal representing a command angular position (a desired angular potions) of the joint. The information of the present angular position of the joint is used as a feedback signal in the control of the joint drive motor. The control of the joint drive motor is based on a feedback basis so that the present angular position of the joint can be equal to the command angular position thereof.

This feedback control is implemented via a control unit (a computer-based circuit) which operates in accordance with an operation program. For the feedback control, the control unit executes the following steps.

The control unit determines a speed pattern on the basis of parameters read out from the operation program. When every sampling period of time has elapsed, the control unit calculates an angular position of the joint from the speed pattern which will occur at a moment following the present moment by one sampling period. The control unit sets the calculated angular position as a command angular position of the joint. The control unit is informed of the present angular position of the joint by the rotary encoder. The control unit compares the present angular position of the joint and the command angular position thereof. The control unit adjusts the speed of rotation of the joint drive motor in response to a result of the comparison so that the joint will reach the command angular position after a unit control time equal in length to one sampling period. As a result of this adjustment process, the joint operates in accordance with a speed pattern similar to the speed pattern determined according to the operation program.

Similarly, rotation of each of other joints in the robot is controlled. Thus, an operative end of the robot moves in accordance with the operation program.

A general robot is designed so that when a load torque of a joint drive motor exceeds a limit value such as a maximum allowable value, the motor is suspended for protection. Therefore, during a teaching process of making an operation program for the robot, operation speeds of joints are set so as to prevent joint drive motors from undergoing overload.

It is troublesome to execute a teaching process while considering load torque limits of respective joint drive motors. Thus, the teaching process tends to be inefficiently implemented. Since the operation speeds of the joints are set so as to prevent the joint drive motors from undergoing overload, the torques of the motors remain below maximum allowable values in almost all operating conditions of the robot. However, in this case, the torques of the motors tend to be significantly lower than the maximum allowable values. Accordingly, mean operation speeds of the joints are relatively low, and work by the robot tends to spend a relatively long time (a relatively long tact time).

Japanese published unexamined patent application 5-138563 discloses a control apparatus for a robot which is designed to remove such a problem. Generally, the load on a joint drive motor peaks at a time point near the moment of end of acceleration of the motor or the moment of start of deceleration thereof. In the control apparatus of Japanese application 5-138563, to prevent the load torque of the motor from exceeding a limit value at time points near the moment of end of acceleration and the moment of start of deceleration, the acceleration and deceleration degrees of the motor are determined according to load conditions of the motor at its positions corresponding to the end of acceleration and the start of deceleration.

In the control apparatus of Japanese application 5-138563, since the acceleration and deceleration degrees of the motor are determined at the acceleration end position and the deceleration start position, the motor does not always exhibit its maximum capabilities. On the other hand, at operating positions except the acceleration end position and the deceleration start position, there is a chance that the capabilities of the motor will exceed a maximum level.

In the control apparatus of Japanese application 5-138563, the acceleration and deceleration degrees of a joint drive motor are determined at an acceleration end position and a deceleration start position for each of joints. This method is suited for a process (a PTP process) of setting a speed pattern joint by joint. However, this method can not be applied to the case of setting the trajectory (the locus) of an operative end of a robot. If it is applied, the trajectory of the operative end of the robot will deviate from a programmed trajectory or a desired trajectory.

Japanese published unexamined patent application 64-7105 corresponding to PCT application WO 89/00305 discloses a control system for a robot in which a drive motor for an arm of the robot is controlled under predetermined operating conditions. Specifically, the operating conditions are determined and data representative thereof are stored into a memory before the drive motor is powered to actuate the robot arm. In the control system of Japanese application 64-7105, the predetermined operating conditions include a speed condition and a time constant. During the determination of the operating conditions which is implemented before actual operation of the robot, a ratio between a load torque and a maximum output torque of the motor is calculated. When the calculated ratio is approximately equal to "1", an original speed condition and an original time constant are directly used in the operating conditions. When the calculated ratio appreciably exceeds "1", at least one of the speed condition and the time constant is changed in the direction of decreasing the ratio. As a result, the speed condition and the time constant finally used in the operating conditions correspond to a state where the load torque and the maximum output torque of the motor are approximately equal to each other.

SUMMARY OF THE INVENTION

It is a first object of this invention to provide a control apparatus for a robot which is able to maximally use the capabilities of a power source (for example, a motor) to actuate a joint if necessary.

It is a second object of this invention to provide a control apparatus for a robot which can control operation of a joint without causing an error in the trajectory (the locus) of an operative end of the robot.

A first aspect of this invention provides a control apparatus for a robot including a joint. The control apparatus comprises position calculation means for, in cases where every sampling time has elapsed, calculating a position of the joint which will occur at a moment of end of a next sampling time on the basis of a speed pattern; torque calculation means for calculating a drive torque designed to move the joint to the position calculated by the position calculation means; sampling time change means for, in cases where the drive torque calculated by the torque calculation means exceeds a predetermined limit value, calculating a speed change ratio designed to reduce the drive torque, and calculating a corrected sampling time on the basis of the calculated speed change ratio, the corrected sampling time being shorter than a normal sampling time; means for, in cases where the drive torque calculated by the torque calculation means does not exceed the predetermined limit value, setting the position calculated by the position calculation means as a command position and controlling the joint to move to the command position after a predetermined unit control time elapses; and means for, in cases where the drive torque calculated by the torque calculation means exceeds the predetermined limit value, enabling the position calculation means to calculate a position of the joint while using the corrected sampling time calculated by the sampling time change means as the next sampling time, and setting the position calculated by the position calculation means as a command position and controlling the joint to move to the command position after the predetermined unit control time elapses.

A second aspect of this invention provides a control apparatus for a robot including a joint. The control apparatus comprises position calculation means for, in cases where every sampling time has elapsed, calculating a position of the joint which will occur at a moment of end of a next sampling time on the basis of a speed pattern; torque calculation means for calculating a drive torque designed to move the joint to the position calculated by the position calculation means; speed change ratio calculation means for, in cases where the drive torque calculated by the torque calculation means exceeds a predetermined limit value, calculating a speed change ratio designed to reduce the drive torque; means for, in cases where the drive torque calculated by the torque calculation means does not exceed the predetermined limit value, setting the position calculated by the position calculation means as a command position and controlling the joint to move to the command position after a unit control time elapses; and means for, in cases where the drive torque calculated by the torque calculation means exceeds the predetermined limit value, setting the unit control time longer than a normal unit control time on the basis of the speed change ratio calculated by the speed change ratio calculation means, and setting the position calculated by the position calculation means as a command position and controlling the joint to move to the command position after the unit control time, which is set longer, elapses.

A third aspect of this invention provides a robot comprising a joint; a motor for driving the joint; first means for calculating a torque output of the motor; second means for deciding whether or not the torque output calculated by the first means exceeds a predetermined limit; and third means for reducing the torque output of the motor in cases where the second means decides that the torque output calculated by the first means exceeds the predetermined limit.

BRIEF DESCRIPTION OF THE DRAWINGS

FIG. 5 is a flowchart of a segment of a program for a CPU in FIG. 2.

DESCRIPTION OF THE PREFERRED EMBODIMENT

Figure 1:
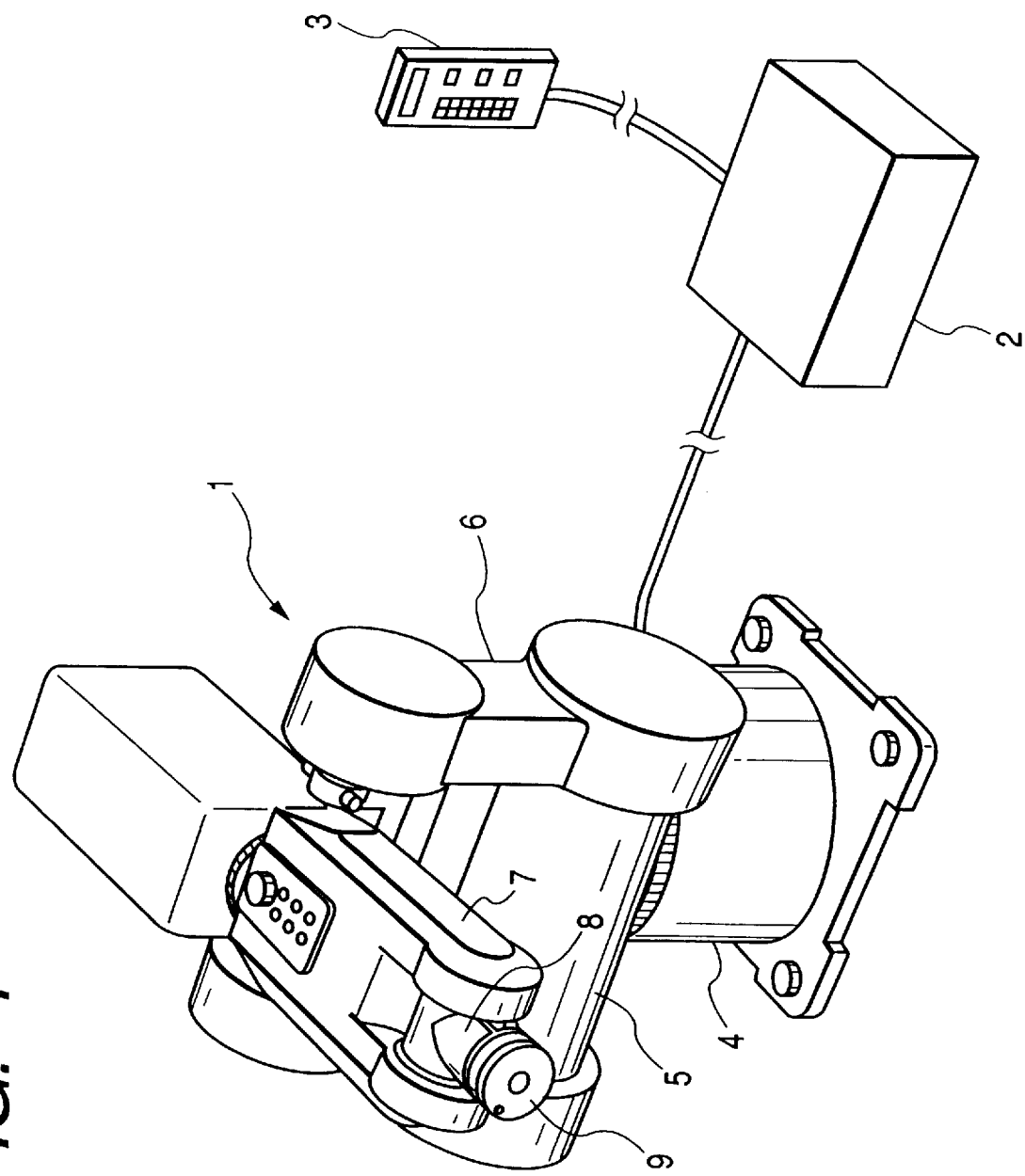
FIG. 1 is a perspective view of a robot equipped with a control apparatus according to an embodiment of this invention.

With reference to FIG. 1, a robot includes a body (a robot body) 1, a control unit 2, and a teaching pendant 3. The control unit 2 is electrically connected to the robot body 1. The control unit 2 is designed to control the robot body 1. The teaching pendant 3 is electrically connected to the control unit 2.

The robot body 1 is of, for example, a vertical multiple-joint type designed for assembling work. The robot body 1 includes a base 4, a shoulder portion 5, a lower arm 6, an upper arm 7, and a wrist 8. The shoulder portion 5 is provided on the base 4 via a joint. The shoulder portion 5 can rotate relative to the base 4 about a vertical axis. The lower arm 6 is connected to the shoulder portion via a joint. The lower arm 6 can rotate relative to the shoulder portion 5 about a longitudinal axis or a horizontal axis of the shoulder portion 5. The upper arm 7 is connected to the lower arm 6 via a joint. The upper arm 7 can rotate relative to the lower arm 6 about a horizontal axis. In addition, the upper arm 7 can twist relative to the lower arm 6 about a longitudinal axis of the upper arm 7. The wrist 8 is provided on the upper arm 7 via a joint. The wrist 8 can rotate relative to the upper arm 7 about an axis, which extends horizontally when the upper arm 7 is in its untwisted position.

The wrist 8 has an end provided with a flange 9. A joint is connected between the flange 9 and a main portion of the wrist 8. The flange 9 can twist relative to the wrist 8 about an axis of the flange 9. A hand (not shown) for grasping a work tool or a work member can be connected to the flange 9.

Joints are provided in the connections among the base 4, the shoulder portion 5, the lower arm 6, the upper arm 7, the wrist 8, and the flange 9. The joints are coupled to actuators such as direct-current servo motors via power transmission mechanisms (not shown), respectively. Rotational drives of the joints by the actuators result in rotation of the shoulder portion 5, rotation of the lower arm 6, rotation of the upper arm 7, rotation of the wrist 8, and rotation of the flange 9, respectively. The actuators are drive sources or power sources.

Figure 2:
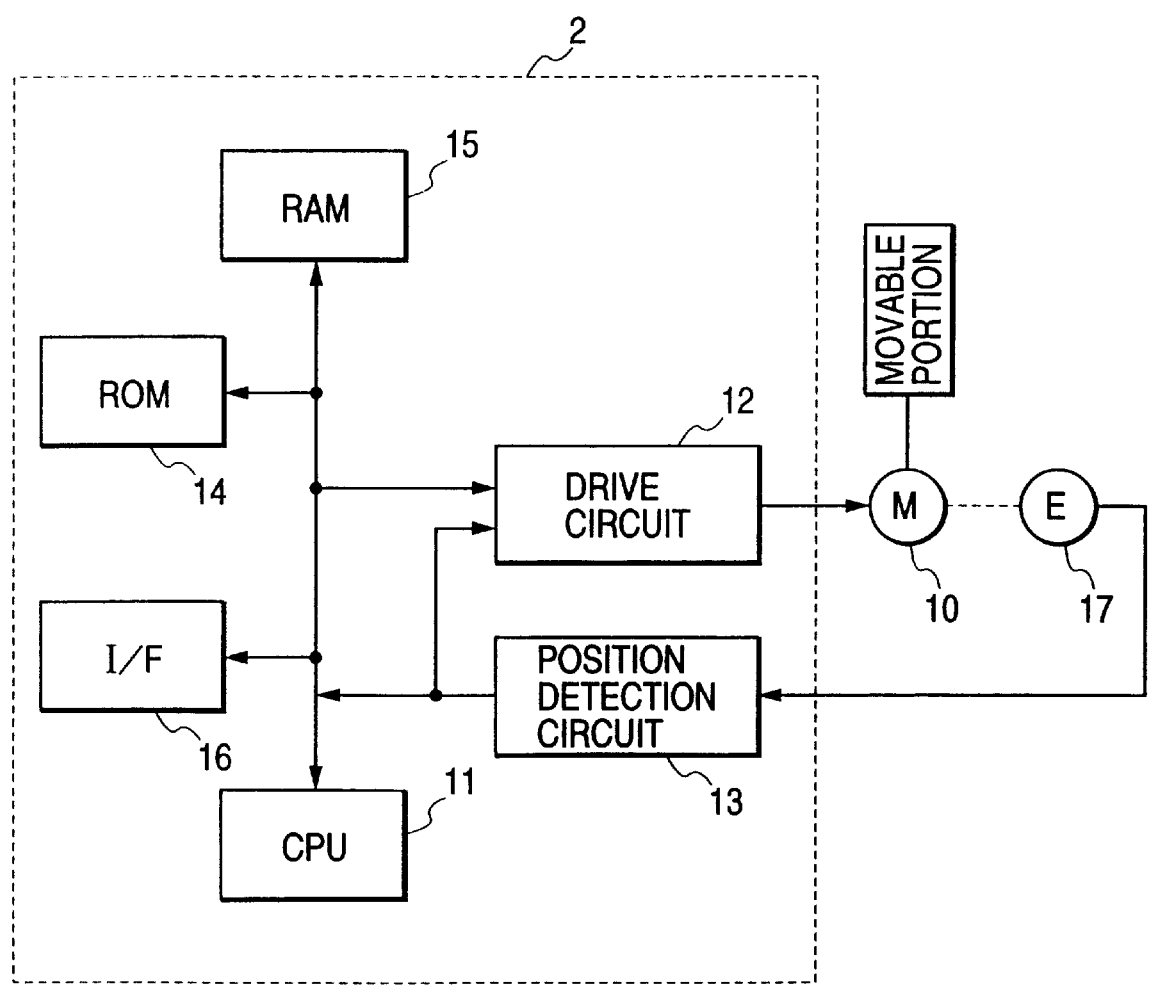
FIG. 2 is a block diagram of an electric portion of the control apparatus according to the embodiment of this invention.

FIG. 2 shows a motor 10 being one of the actuators. The output shaft of the motor 10 is coupled to one of the joints or a movable portion of the robot body 1 which is one of the shoulder portion 5, the lower arm 6, the upper arm 7, the wrist 8, and the flange 9.

As shown in FIG. 2, the control unit 2 includes a combination of a CPU 11, a drive circuit 12, a position detection circuit 13, a ROM 14, a RAM 15, and an interface 16. The drive circuit 12 is electrically connected to the motor 10. The drive circuit 12 powers the motor 10. The position detection circuit 13 cooperates with a rotary encoder 17 to implement a position detecting process. The ROM 14 stores a system program for the whole of the robot. The RAM 15 stores an operation program (a control program) for the robot body 1. The teaching pendant 3 (see FIG. 1) is connected to the interface 16. During a teaching process which is implemented prior to actual operation of the robot, the teaching pendant 3 is used in inputting various information pieces into the control unit 2.

The rotary encoder 17 is electrically connected to the position detection circuit 13. The rotary encoder 17 is associated with the output shaft of the motor 10. The rotary encoder 17 generates a pulse signal depending on the rotational angle (the angular position) of the output shaft of the motor 10. The rotary encoder 17 outputs the pulse signal to the position detection circuit 13. The position detection circuit 13 derives the current angular position (the present angular position) of the output shaft of the motor 10 from the output signal of the rotary encoder 17. The current angular position of the output shaft of the motor 10 corresponds to the current angular position (the present angular position) of a related joint. Thus, the position detection circuit 13 generates information of the current angular position of the output shaft of the motor 10, that is, the current angular position of the related joint. The position detection circuit 13 feeds the positional information to the drive circuit 12 and the CPU 11.

The CPU 11 generates information of a command rotational position (a command rotational angle) of the output shaft of the motor 10. The CPU 11 feeds the command positional information to the drive circuit 12. The drive circuit 12 compares the command rotational angle and the current rotational angle, and hence derives a difference therebetween. The drive circuit 12 generates a current depending on the derived difference. The drive circuit 12 feeds the generated current to the motor 10, and drives the motor 10 in accordance with the generated current. Motors (actuators) for the other joints are similarly controlled. Thereby, a central portion of the flange 9 which is an operative robot end moves along a trajectory determined according to the operation program. The movement of the operative robot end implements, for example, assembling work.

For every movement (every operation) of the robot, parameters such as a movement end position, a speed coefficient, and an acceleration/deceleration coefficient are recorded in the operation program. The speed coefficient and the acceleration/deceleration coefficient relate to a maximum speed and a maximum acceleration/deceleration in operation or movement which are determined according to rates with respect to a maximum allowable speed and a maximum allowable acceleration/deceleration. The maximum allowable speed and the maximum allowable acceleration/deceleration are set in consideration of the capabilities of the motor 10 so that the load torque of the motor 10 will not exceed a maximum allowable torque.

The CPU 11 reads out the parameters from the operation program. The CPU 11 determines a speed pattern on the basis of the parameters through an application to a trapezoidal pattern. The CPU 11 calculates a desired rotational angle of the joint at every sampling moment by referring to the speed pattern. The CPU 11 informs the drive circuit 12 of the desired rotational angle as a command angle value.

Figure 3:
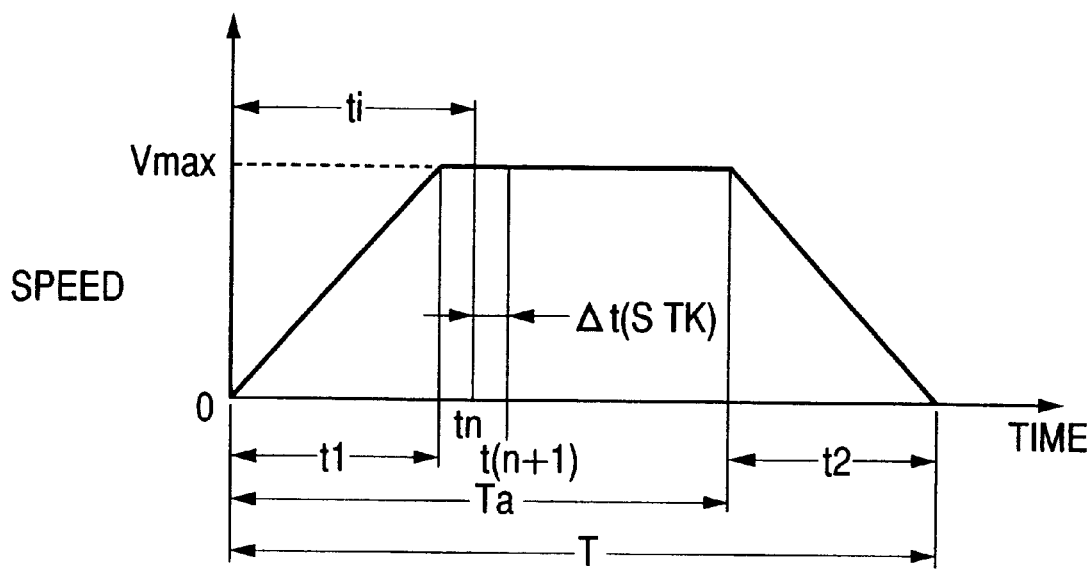
FIG. 3 is a diagram of an example of a speed pattern used in the control apparatus of FIG. 2.

FIG. 3 shows a trapezoidal speed pattern determined by the CPU 11. The trapezoidal speed pattern in FIG. 3 is composed of a first portion corresponding to an acceleration stage, a second portion corresponding to a constant-speed stage with a maximum speed Vmax, and a third portion corresponding to a deceleration stage. A pattern of an operation angle (a rotational angle) which corresponds to the trapezoidal speed pattern has a shape such as shown in FIG. 4.

The angle of the joint which occurs at a moment "tn" is denoted by θn. The angle of the joint which occurs at a moment "t(n+1)" is denoted by θ(n+1). The moment "t(n+1)" follows the moment "tn". The angular velocity (the angular speed) of the joint which occurs at the moment "t(n+1)" is denoted by V(n+1).

Figure 4:
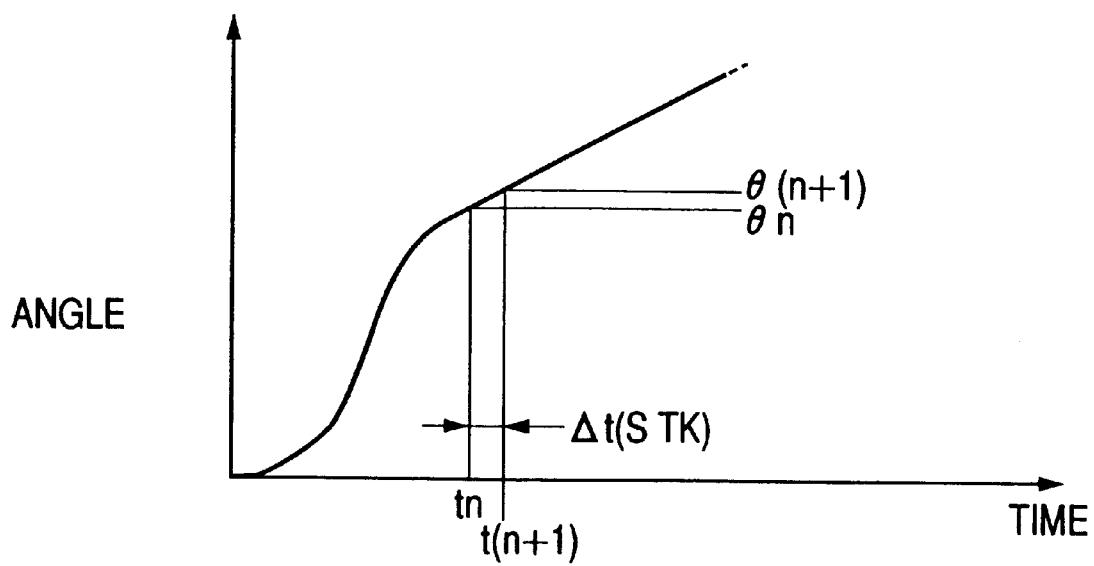
FIG. 4 is a time-domain diagram of an example of an operation angle (a rotational angle) in the control apparatus of FIG. 2.

According to the angle pattern in FIG. 4, the angle θn, the angle θ(n+1), and the angular velocity V(n+1) have the following relation.

$$V(n+1) \cdot \Delta t = \theta(n+1) - \theta n \tag{1}$$

where "Δt" denotes the interval of time between the moment "t(n+1)" and the moment "tn" which is equal to, for example, a given sampling period of time (a given sampling time). The equation (1) is transformed into an equation (2) as follows.

$$\theta(n+1) = \theta n + V(n+1) \cdot \Delta t \tag{2}$$

The angle θ(n+1) of the joint which occurs the time interval "Δt" after the moment "tn" can be calculated from the angle θn, the angular velocity V(n+1), and the time interval "Δt" by referring to the equation (2). Thus, during the interval of time between a movement start moment and a movement end moment, the angle of the joint, which occurs when every sampling period "Δt" has elapsed, can be calculated in the following way. Each time one sampling period "Δt" elapses after the movement start moment, the speed which will occur at a next sampling point (a moment the time interval "Δt" after the present moment) is calculated according to the speed pattern. The calculated speed is multiplied by the sampling period "Δ". The previous and latest multiplication-resultant values are added. The result of the addition indicates the calculated angle of the joint which occurs each time one sampling period "Δt" elapses. Information of the calculated angle of the joint is fed to the drive circuit 12 as a command angle, and the joint is moved in accordance with the speed pattern.

In the robot of FIG. 1, information of a desired trajectory (a desired locus) of the operative robot end is set in the operation program, and the joints are controlled so as to move the operative robot end in accordance with the desired trajectory. In the case of control of one movement (one operation) of the robot, the CPU 11 reads out the parameters from the operation program, and determines the speed pattern on the basis of the parameters. At every sampling point, the CPU 11 calculates a position of the operative robot end, which will occur at a next sampling point, according to the speed pattern. Then, the CPU 11 calculates desired angles of the respective joints from the calculated position of the operative robot end.

FIG. 5 is a flowchart of a program segment for controlling the CPU 11. Regarding the program segment in FIG. 5, the sampling period "Δt" is defined as an addition time amount STk. The elapsed time between the movement start moment and the present sampling point is defined as a command operation time "ti". An interval of time for controlling and moving the joint (the motor 10) from the present angle to a command angle is defined as a unit control time "tu". Under normal conditions, the addition time amount STk is set to a predetermined constant period of time or a normal value which is indicated by the character ST. On the other hand, when the drive torque for moving the joint to the command angle is expected to exceed the limit value (equal to the maxim allowable torque of the motor 10), the addition time amount STk is set to a time shorter than the previously-mentioned predetermined constant period (the previously-mentioned normal value) ST. The unit control time "tu" remains equal to a predetermined time corresponding to one sampling period.

The program segment in FIG. 5 is started each time the execution of one movement of the robot is required. A first step S1 of the program segment in FIG. 5 reads out information of parameters from the operation program. The parameters include a movement end position, and coefficients of a speed and an acceleration/deceleration. The step S1 determines a speed pattern on the basis of the parameters as will be explained below.

The step S1 reads out information of the maximum allowable acceleration of the motor 10, information of the maximum allowable deceleration of the motor 10, and information of the maximum allowable speed of the motor 10 from the operation program. Furthermore, the step S1 derives information of a movement start position (the present position of the motor 10) from the output signal of the position detection circuit 13.

The step S1 calculates an acceleration "α" and a deceleration "β" from the maximum allowable acceleration of the motor 10, the maximum allowable deceleration of the motor 10, and the acceleration/deceleration coefficient. Specifically, the acceleration "α" and the deceleration "β" are equal to the maximum allowable acceleration and deceleration multiplied by the acceleration/deceleration coefficient. In addition, the step S1 calculates a maximum speed Vmax from the maximum allowable speed of the motor 10 and the speed coefficient. Specifically, the maximum speed Vmax is equal to the maximum allowable speed multiplied by the speed coefficient. Furthermore, the step S1 calculates the distance L traveled by the operative robot end from the movement start position to the movement end position. The distance L is also referred to as the movement amount L.

The step S1 determines the speed pattern on the basis of the movement amount L, the acceleration "α", the maximum speed Vmax, and the deceleration "β" through an application to the trapezoidal pattern in FIG. 3.

A step S2 following the step S1 calculates operation parameters which form the speed pattern. The operation parameters include the time t1 required for the acceleration stage, the time t2 required for the deceleration stage, and the time T required from the movement start to the movement end (see FIG. 3). It should be noted that the maximum speed Vmax is contained in the operation parameters. Specifically, the time t1 of the acceleration stage, the time t2 of the deceleration stage, and the time T of the movement are calculated according to the following equations.

$$t1 = Vmax/\alpha \quad (3)$$

$$t2 = Vmax/\beta \quad (4)$$

$$T = (L/Vmax) + Vmax \cdot (1/\alpha + 1/\beta)/2 \quad (5)$$

A step S3 subsequent to the step S2 initializes the command operation time "ti" to "0". In other words, the step S3 executes the initialization setting as "ti=0". This initialization causes the present moment to be set at the origin (the movement start point) regarding the time axis (the time base) in the speed pattern of FIG. 3. After the step S3, the program advances to a step S4.

The step S4 initializes the addition time amount STk to a predetermined time value ST. After the step S4, the program advances to a step S5.

The step S5 calculates the position of the operative robot end which occurs at a moment following the present moment "ti" by the addition time amount STk. The movement start position of the operative robot end is given by three-dimensional coordinates (Xs, Ys, Zs) and slope angles (αs, βs, γs) with respect to the three axes of the three-dimensional coordinates. The movement end position of the operative robot end is given by three-dimensional coordinates (Xe, Ye, Ze) and slope angles (αe, βe, γe) with respect to the three axes of the three-dimensional coordinates. Components of the maximum speed Vmax of the operative robot end in straight directions along the three axes of the three-dimensional coordinates are expressed as "(Vmx, Vmy, Vmz)". Components of the maximum speed Vmax of the operative robot end in circular directions or circumferential directions around the three axes of the three-dimensional coordinates are expressed as "(Vmα, Vmβ, Vmγ)". The position of the operative robot end which occurs at a moment "t" is given by three-dimensional coordinates (Xt, Yt, Zt) and slope angles (αt, βt, γt) with respect to the three axes of the three-dimensional coordinates. The positional component Xt is given as follows.

$$t \leq t1 \qquad Xt = \frac{1}{2} \cdot \frac{t^2}{t1} \cdot Vmx + Xs \quad (6)$$

$$t < t \leq Ta \qquad Xt = \frac{1}{2} Vmx \cdot t1 + Vmx \cdot (t - t1) + Xs \quad (7)$$

$$Ta < t \qquad Xt = Xe - \frac{1}{2} \cdot (t2 - t1 + T)^2 \cdot \frac{Vmx}{t2} \quad (8)$$

where Ta denotes the time interval between the movement start moment and the point between the constant-speed stage and the deceleration stage as shown in FIG. 3. The positional components Yt and Zt, and the slope angle components αt, βt, and γt are given in similar ways. The position of the operative robot end which will occur at a moment following the present moment "ti" by the addition time amount STk is calculated in accordance with the positional components Xt, Yt, and Zt, and the slope angle components αt, βt, and γt.

For each of the joints, a step S6 following the step S5 calculates the position of the joint, which will occur at a moment "(ti+STk)", on the basis of the operative robot end position calculated by the step S5. The step S6 sets the calculated position of the joint as a provisional command angle of the joint.

For each of the joints, a step S7 subsequent to the step S6 calculates a drive torque (a load toque of the motor 10) required for movement of the joint from the present position to the provisional command joint angle during the addition time amount STk. The calculated drive torque is also referred to as a provisional joint drive torque.

In the case of a robot having "n" (n=1, 2, ..., i, ...) joints, the drive torque "τi" for an i-th joint is calculated according to the following equation.

$$\tau i = \sum_j fj(\theta 1 \cdots \theta n) \ddot{\theta} j + \sum_{km} hkm(\theta 1 \cdots \theta n) \dot{\theta} k \dot{\theta} m + Di\dot{\theta}i + gi(\theta 1 \cdots \theta n) \quad (9)$$

where "θj" denotes the angle of a j-th joint; "θ̇j" denotes the angular velocity of the j-th joint; "θ̈j" denotes the angular acceleration of the j-th joint; "fj" denotes a predetermined function for the j-th joint; and "gi" denotes a predetermined function for the i-th joint. In the right-hand side of the equation (9): the first term represents a factor proportional to the angular acceleration of each of the joints; the second term represents a factor proportional to the product of the angular velocities of two joints; the third term represents a factor proportional to the angular velocity of the i-th joint; and the fourth term represents a constant factor. In the case where the weight of the hand or the weight of a work tool or a work member grasped by the hand is not negligible, it is preferable to incorporate a related weight factor into the equation (9) to provide more accurate calculation of the drive torque.

For each of the joints, a step S8 following the step S7 compares the provisional joint drive torque with a predetermined limit value equal to the maximum allowable torque of the motor 10. When the provisional joint drive torque is equal to or smaller than the predetermined limit value, that is, when the provisional joint drive torque is equal to or smaller than the maximum allowable torque of the motor 10, the program advances from the step S8 to a step S9. Otherwise, the program advances from the step S8 to a step S13.

For each of the joints, the step S9 transfers information of the provisional command joint angle to a buffer as an indication of a final command joint angle. The buffer includes, for example, an accumulator in the CPU 11.

A step S10 subsequent to the step S9 compares the command operation time "ti" with the time T of the movement to decide whether or not the movement has been completed. When the command operation time "ti" is smaller or shorter than the time T of the movement (ti<T), that is, when the movement has not been completed yet, the program advances from the step S10 to a step S11. Otherwise, the program exits from the step S10, and then the current execution cycle of the program segment ends.

For each of the joints, the step S11 transmits the information of the final command joint angle from the buffer to the drive circuit 12 (see FIG. 2).

A step S12 following the step S11 updates the command operation time "ti". Specifically, the step S12 increments the command operation time "ti" by the addition time amount STk according to the program statement "ti=ti+STk". After the step S12, the program returns to the step S4. Accordingly, under normal conditions, the sequence of the step S4 and the later steps is iterated until the end of the time T of the movement.

Specifically, the following processes are iterated. When every unit control time "tu" has elapsed, the CPU 11 calculates a provisional command angle for each of the joints which will occur the addition-time-amount STk thereafter in a way similar to the previously-mentioned way. Provided that a related provisional joint drive torque is equal to or smaller than the limit value, the CPU 11 feeds information of the provisional command joint angle to the drive circuit 12 as an indication of the final command angle.

Accordingly, the drive circuit 12 is informed of a command angle of each of the joints when every unit control time "tu" has elapsed. The drive circuit 12 divides the unit control time "tu" into "n" sub unit control times "tu/n", and calculates command angles of the joint for the respective sub unit control times "tu/n" where "n" denotes a predetermined natural number. For each of the sub unit control times "tu/n", the drive circuit 12 derives the actual present angle of each of the joints from the output signal of the position detection circuit 13. For each of the sub unit control times "tu/n", the drive circuit 12 compares the command angle of each of the joints with the actual present angle thereof, and calculates the difference therebetween and generates a current in accordance with the calculated difference. The drive circuit 12 feeds the generated current to the related motor 10 so that the actual angle of each of the joints will be equal to the command angle thereof. Since the addition time amount STk and the unit control time "tu" are equal under normal conditions, the actual angular velocity of each of the joints and the actual angular velocity of the operative robot end are accorded with the speed pattern determined in the step S1 of FIG. 5.

When the step S8 determines that the provisional joint drive torque exceeds the maximum allowable torque of the motor 10 for at least one of the joints, the program advances from the step S8 to the step S13.

The step S13 calculates a corrected angular velocity $\dot{\theta}j'$ of the j-th joint, and a corrected angular acceleration $\ddot{\theta}j'$ of the j-th joint by referring to the following equations.

$$\dot{\theta}j' = R\dot{\theta}j \qquad (10)$$

$$\ddot{\theta}j = \frac{1}{\Delta T}(\dot{\theta}j - \dot{\theta}jpr) \qquad (11)$$

$$\ddot{\theta}j' = \frac{1}{\Delta T}(R\dot{\theta}j - \dot{\theta}jpr) = R\ddot{\theta}j + \frac{R-1}{\Delta T}\dot{\theta}jpr \qquad (12)$$

where "$\dot{\theta}jpr$" denotes the angular velocity of the j-th joint which occurs at a moment preceding the present moment by one sampling period; R denotes an angular velocity variation rate; and $\Delta T$ denotes the sampling period of time. The angular velocity variation rate R is also referred to as the speed change ratio R. The step S13 substitutes the corrected angular velocity $\dot{\theta}j'$ of the j-th joint, and the corrected angular acceleration $\ddot{\theta}j'$ of the j-th joint for the angular velocity $\dot{\theta}j$ of the j-th joint, and the angular acceleration $\ddot{\theta}j$ of the j-th joint in the equation (9) respectively. Thereby, the step S13 calculates the speed change ratio R at which the drive torque will not exceed the limit value "$\tau$imax".

Specifically, the substitution of the corrected angular velocity $\dot{\theta}j'$ and the corrected angular acceleration $\ddot{\theta}j'$ for the angular velocity $\dot{\theta}j$ and the angular acceleration $\ddot{\theta}j$ in the equation (9) provides the following equation.

$$C1 \cdot R^2 + C2 \cdot R + C3 = 0 \qquad (13)$$

In the equation (13), C1, C2, and C3 are given as follows.

$$C1 = \sum_{km} hkm(\theta 1 \cdots \theta n)\dot{\theta}k\dot{\theta}m \qquad (14)$$

$$C2 = \sum_{j} fj(\theta 1 \cdots \theta n)\left(\ddot{\theta}j + \frac{1}{\Delta T}\dot{\theta}jpr\right) + Di\dot{\theta}i \qquad (15)$$

$$C3 = gi(\theta 1 \cdots \theta n) - \tau imax - \frac{1}{\Delta T}\sum_{j} fj(\theta 1 \cdots \theta n)\dot{\theta}jpr \qquad (16)$$

where "$\tau$imax" denotes the limit torque of the motor 10 for the i-th joint. The step S13 solves the equation (13), and hence derives the speed change ratio R which is given by the following relation.

$$R = \frac{1}{2C1}\left(-C2 \pm \sqrt{C2^2 - 4C1 \cdot C3}\right) \quad (17)$$

As indicated by the relation (17), there are positive and negative speed change ratios R. The step S13 uses positive one as a final speed change ratio R. The final speed change ratio R is in the range of 0 to 1.

A step S14 following the step S13 updates or corrects the addition time amount STk. Specifically, the step S14 decreases the addition time amount STk below the normal value ST. In more detail, the step S14 sets a corrected addition time amount (a correction-resultant addition time amount) STk to the product of the previously-mentioned normal value ST and the final speed change ratio R. In other words, the step S14 executes the calculation as "STk=R•ST". After the step S14, the program returns to the step S5.

The step S5 calculates the position of the operative robot end which will occur at a moment following the present moment "ti" by the correction-resultant addition time amount STk (=R•ST). Then, the step S6 calculates a provisional command angle of each of the joints in response to the correction-resultant addition time amount STk in a way similar to the previously-mentioned way. Subsequently, the step S7 calculates a provisional drive torque for each of the joints. Next, the step S8 compares the provisional joint drive torque with the predetermined limit value. When the provisional joint drive torque is equal to or smaller than the predetermined limit value, the program advances from the step S8 to the step S9. For each of the joints, the step S9 transfers information of the provisional command joint angle to the buffer as an indication of a final command joint angle. In the case where the program advances from the step S9 to the step S11 via the step S10, the step S11 transmits the information of the final command angle for each of the joints from the buffer to the drive circuit 12 (see FIG. 2).

In this case, the final command angle responds to the correction-resultant addition time amount STk (=R•ST). Since the correction-resultant addition time amount STk is smaller than the normal value ST, the final command angle of each of the joints is closer to the present angle than the uncorrected command angle value is. Thus, the final command angle of each of the joints corresponds to a smaller angular movement of the joint. On the other hand, the drive circuit 12 does not decrease the unit control time "tu" but holds it equal to the normal value ST. In addition, the drive circuit 12 implements the smaller angular movement of each of the joints to the command angle during the unit control time "tu" which remains unchanged. Therefore, the actual angular velocity or the actual angular acceleration of each of the joints is decreased so that the drive torque for each of the joints can be equal to or smaller than the limit value.

As previously mentioned, the provisional command joint angle value is calculated and also the provisional joint drive torque is calculated when every addition time amount STk has elapsed. In the case where the provisional command joint drive torque exceeds the limit value, the provisional command joint angle is corrected so that the provisional command joint drive torque will be equal to or smaller than the limit value. Accordingly, the actual speeds and the actual accelerations/decelerations of the joints are controlled to be equal to or smaller than their limit values even if the speed coefficient and the acceleration/deceleration coefficient are set relatively great during a teaching process.

Thus, it is unnecessary to set the speed coefficient and the acceleration/deceleration coefficient while taking care to prevent the motor 10 from falling into an overload state. Therefore, it is possible to easily execute the teaching process. The capabilities of the motor 10 can be maximally used when the maximum speed Vmax or the acceleration/deceleration is set great. Accordingly, it is possible to shorten the time (the tact time) of work by the robot.

In the case where the provisional command joint drive torque exceeds the limit value, the addition time amount STk is corrected so that the provisional command joint drive torque will be equal to or smaller than the limit value. As a result, the actual speeds and the actual accelerations/decelerations of the joints are controlled to be equal to or smaller than their limit values. Although the actual speeds and the actual accelerations/decelerations of the joints are lower than speeds and accelerations/decelerations derived from the speed pattern, the joints move by angles derived from the speed pattern while the reductions in the speeds and the accelerations/decelerations of the joints correspond to equal rates. Thus, the actual trajectory (the actual locus) of the operative robot end agrees with a programmed trajectory or a desired trajectory.

A first modification of the previously-mentioned embodiment of this invention is designed as follows. The maximum allowable torque of the motor 10 is set as an upper limit value while a torque slightly lower than the maximum allowable torque is set as a lower limit value. In the case where the provisional joint drive torque decreases below the lower limit value, the addition time amount STk is set longer than the normal value ST to correct the command angle. According to this modification, the capabilities of the motor 10 can further be used, and the tact time can be shortened.

A second modification of the previously-mentioned embodiment of this invention is designed as follows. The addition time amount STk remains constant regardless of whether or not the provisional joint drive torque exceeds the limit value. On the other hand, the unit control time "tu" is increased to reduce the angular velocity of each of the joints in the case where the provisional joint drive torque exceeds the limit value.

In the case of PTP control where a desired trajectory (a desired locus) of the operative robot end is not programmed but a speed pattern is determined for each of the joints, a provisional command angle is calculated for each of the joints. When a provisional joint drive torque exceeds its limit value for at least one of the joints, a speed change ratio is calculated for the joint in question. The calculated speed change ratio is applied to the control of all the joints, and an addition time amount or a unit control time is corrected. In this case, the actual trajectory (the actual locus) of the operative robot end can agree with a programmed trajectory or a desired trajectory.

What is claimed is:

1. A control apparatus for a robot including a joint, comprising:

position calculation means for, in cases where every sampling time has elapsed, calculating a position of the joint which will occur at a moment of end of a next sampling time on the basis of a speed pattern;

torque calculation means for calculating a drive torque designed to move the joint to the position calculated by the position calculation means;

sampling time change means for, in cases where the drive torque calculated by the torque calculation means exceeds a predetermined limit value, calculating a speed change ratio designed to reduce the drive torque, and calculating a corrected sampling time on the basis of the calculated speed change ratio, the corrected sampling time being shorter than a normal sampling time;

means for, in cases where the drive torque calculated by the torque calculation means does not exceed the predetermined limit value, setting the position calculated by the position calculation means as a command position and controlling the joint to move to the command position after a predetermined unit control time elapses; and means for, in cases where the drive torque calculated by the torque calculation means exceeds the predetermined limit value, enabling the position calculation means to calculate a position of the joint while using the corrected sampling time calculated by the sampling time change means as the next sampling time, and setting the position calculated by the position calculation means as a command position and controlling the joint to move to the command position after the predetermined unit control time elapses.

2. A control apparatus for a robot including a joint, comprising:

position calculation means for, in cases where every sampling time has elapsed, calculating a position of the joint which will occur at a moment of end of a next sampling time on the basis of a speed pattern;

torque calculation means for calculating a drive torque designed to move the joint to the position calculated by the position calculation means;

speed change ratio calculation means for, in cases where the drive torque calculated by the torque calculation means exceeds a predetermined limit value, calculating a speed change ratio designed to reduce the drive torque;

means for, in cases where the drive torque calculated by the torque calculation means does not exceed the predetermined limit value, setting the position calculated by the position calculation means as a command position and controlling the joint to move to the command position after a unit control time elapses; and means for, in cases where the drive torque calculated by the torque calculation means exceeds the predetermined limit value, setting the unit control time longer than a normal unit control time on the basis of the speed change ratio calculated by the speed change ratio calculation means, and setting the position calculated by the position calculation means as a command position and controlling the joint to move to the command position after the unit control time, which is set longer, elapses.

* * * * *